United States Patent
Brummett et al.

(10) Patent No.: US 7,259,469 B2
(45) Date of Patent: Aug. 21, 2007

(54) VEHICLE AUXILIARY POWER UNIT, ASSEMBLY, AND RELATED METHODS

(75) Inventors: Keiv Brummett, Joshua, TX (US); Bobby L. Pannell, Copper Canyon, TX (US); Neal G. Shields, Fort Worth, TX (US)

(73) Assignee: SCS Frigette Inc., Fort Worth, TX (US)

( * ) Notice: Subject to any disclaimer, the term of this patent is extended or adjusted under 35 U.S.C. 154(b) by 480 days.

(21) Appl. No.: 10/909,829

(22) Filed: Aug. 2, 2004

(65) Prior Publication Data

US 2005/0035657 A1    Feb. 17, 2005

Related U.S. Application Data

(60) Provisional application No. 60/491,401, filed on Jul. 31, 2003.

(51) Int. Cl.
*F02D 29/06* (2006.01)
*H02P 9/04* (2006.01)
*B60H 3/00* (2006.01)
*B60H 1/00* (2006.01)
*B61D 27/00* (2006.01)

(52) U.S. Cl. ............... 290/40 C; 290/42; 165/42; 165/202

(58) Field of Classification Search ........... 290/1 A, 290/40 C; 165/42, 202
See application file for complete search history.

(56) References Cited

U.S. PATENT DOCUMENTS

| | | | |
|---|---|---|---|
| 3,699,870 A | 10/1972 | Cantagallo et al. ........ 454/118 |
| 4,448,157 A | 5/1984 | Eckstein et al. ....... 123/142.5 R |
| 4,611,466 A | 9/1986 | Keedy ..................... 60/174 |
| 4,748,824 A | 6/1988 | Wakabayashi et al. ........ 62/239 |
| 4,762,170 A | 8/1988 | Nijjar et al. ................ 165/43 |
| 5,020,320 A | 6/1991 | Talbert et al. ............ 62/238.7 |
| 5,253,700 A | 10/1993 | Early, Jr. ..................... 165/42 |
| 5,319,944 A | 6/1994 | Uehara ..................... 62/228.4 |
| 5,333,678 A | 8/1994 | Mellum et al. ............... 165/42 |
| 5,765,805 A | 6/1998 | Kennedy ..................... 248/674 |
| 6,047,942 A | 4/2000 | Kennedy ..................... 248/674 |
| 6,441,581 B1* | 8/2002 | King et al. ................ 320/101 |
| 6,470,844 B2* | 10/2002 | Biess ................. 123/142.5 R |
| 6,608,393 B2* | 8/2003 | Anderson ................... 290/1 A |
| 6,681,588 B2 | 1/2004 | Zeigler ........................ 62/239 |
| 6,788,504 B2* | 9/2004 | Vanderkolk ................. 361/42 |
| 7,013,646 B1* | 3/2006 | Serkh et al. ................. 60/698 |
| 7,049,707 B2* | 5/2006 | Wurtele ..................... 290/1 B |
| 7,145,788 B2* | 12/2006 | Plummer .................... 363/141 |
| 7,150,159 B1* | 12/2006 | Brummett et al. ............ 62/236 |

(Continued)

*Primary Examiner*—Darren Schuberg
*Assistant Examiner*—Pedro J. Cuevas
(74) *Attorney, Agent, or Firm*—Bracewell & Giuliani LLP

(57) ABSTRACT

A truck includes an auxiliary power unit having components specifically selected such that they form a stand-alone unit that can fit within an auxiliary compartment of a vehicle and deliver heating, cooling, and additional electric power to the vehicle. Included is an auxiliary engine, an auxiliary alternator, and an auxiliary condenser to provide coolant for a personnel compartment mounted evaporator. An auxiliary voltage regulator provides a ramp-up feature to minimize excessive start-up loads, limits maximum available current from the auxiliary alternator when the auxiliary compressor is engaged, and selectively disables power to electrical components in the event of low vehicle battery voltage. The auxiliary engine includes a radiator system to provide heated fluid for a personnel compartment mounted heat exchanger.

14 Claims, 2 Drawing Sheets

U.S. PATENT DOCUMENTS

| | | |
|---|---|---|
| 7,183,746 B1 * | 2/2007 | Carter .................... 320/116 |
| 2002/0056993 A1 | 5/2002 | Kennedy ................. 290/1 A |
| 2003/0034147 A1 * | 2/2003 | Houck et al. ............. 165/42 |
| 2003/0070849 A1 | 4/2003 | Whitaker ................. 180/68.2 |
| 2003/0141049 A1 * | 7/2003 | Kennedy .................. 165/202 |
| 2004/0104578 A1 * | 6/2004 | Wurtele .................. 290/1 A |
| 2004/0169374 A1 * | 9/2004 | Wurtele et al. ............ 290/1 A |
| 2004/0189091 A1 * | 9/2004 | Algrain et al. ............ 307/10.1 |
| 2004/0195016 A1 * | 10/2004 | Shimizu et al. ........... 180/65.1 |
| 2004/0207205 A1 * | 10/2004 | Kikuchi et al. ........... 290/40 C |
| 2004/0231831 A1 * | 11/2004 | Houck et al. ............. 165/202 |
| 2005/0016713 A1 * | 1/2005 | Houck et al. ............. 165/42 |
| 2005/0035657 A1 * | 2/2005 | Brummett et al. ......... 307/10.1 |
| 2005/0162106 A1 * | 7/2005 | Cho et al. ................ 318/139 |
| 2005/0167090 A1 * | 8/2005 | Kennedy .................. 165/167 |
| 2005/0179262 A1 * | 8/2005 | Cho et al. ................ 290/1 A |
| 2005/0279542 A1 * | 12/2005 | Maslov et al. ............ 180/65.2 |
| 2006/0023480 A1 * | 2/2006 | Plummer .................. 363/146 |
| 2006/0107920 A1 * | 5/2006 | Serkh et al. ............. 123/198 R |
| 2006/0131885 A1 * | 6/2006 | Wurtele .................. 290/1 A |
| 2006/0226669 A1 * | 10/2006 | Tong et al. ............... 296/24.3 |
| 2007/0022995 A1 * | 2/2007 | Marchand et al. ........ 123/179.3 |
| 2007/0052241 A1 * | 3/2007 | Pacy ...................... 290/1 R |
| 2007/0095321 A1 * | 5/2007 | Marchand et al. ........ 123/179.3 |

* cited by examiner

VEHICLE AUXILIARY POWER UNIT, ASSEMBLY, AND RELATED METHODS

RELATED APPLICATIONS

This application is related to and claims priority from provisional application Ser. No. 60/491,401, filed Jul. 31, 2003, titled "Voltage Regulator for Auxiliary Power Unit."

BACKGROUND OF THE INVENTION

1. Field of the Invention

The present invention relates generally to auxiliary power systems for vehicles, more specifically to power regulation of an auxiliary power unit to operate the auxiliary air conditioning and heating system.

2. Description of the Related Art

Many vehicles in particular truck tractors typically referred to as semi-tractor-trailers are equipped with sleeping and resting compartments. These compartments are provided to save driver the time and expense of procuring local sleeping arrangements during extended down-time and to allow the driver to provide personal security to the vehicle, along with other incidental benefits.

A problem faced by the drivers of these vehicles is that during very warm weather and very cold weather, the drivers have traditionally needed to run their main engines to keep the vehicle cabin area comfortable enough for the driver to obtain adequate rest, to allow the driver amenities such as the ability to watch television or listen to the radio, or to have refrigerated foods. Additionally, particularly in cold weather, when the vehicle is not being driven or stopped briefly, and where external electric power outlets are not readily available to the drivers, the drivers have traditionally needed to run their main engines to assure the engines would maintain sufficient compression and adequate lubrication to restart. Running the main vehicle engine during an extended stop, however, is not only very inefficient, is recognized that it is an environmentally unsound practice, and due to the recent increase in cost of fuel, it is becoming a less financially viable option.

One solution to the problem of maintaining an ergonomic environment for the drivers, and maintaining the ability for the vehicle to restart during cold weather, has been to use an auxiliary power plant consisting of an auxiliary engine and a generator, typically co-positioned with the main vehicle engine to directly power the vehicles air-conditioning, heating, or electrical components normally powered by the main engine. There is, however, limited ability to position such power plant in the main engine compartment. Additionally, positioning such components in the main engine compartment has resulted in increased difficulty of performing maintenance.

A recent innovation in the art has been to position an auxiliary power unit and an existing auxiliary compartment. These units, however, generally only consist of an engine or power plant and a generator and do not provide independent air-conditioning and heating systems and thus, have many of the same maintainability issues as the power plants or power sources positioned in the main engine compartment.

Recognized, therefore, is the need for a compact auxiliary power unit which is generally self-contained and can be housed in an existing or modified auxiliary compartment of the vehicle, and that includes within the auxiliary compartment a generator to provide electric power to power various electronic components in the vehicle cabin, a heating system, an air-conditioning system. Recognized also is the need for an auxiliary power unit which includes sensors and circuitry to monitor and control the electrical components and power requirements.

Another problem faced by drivers employing prior auxiliary power unit systems involve difficulty in starting the units and reduced service life due to the units being subjected to heavy loads during startup. Thus, also recognized is the need for a compact auxiliary power unit which includes an RPM sensor or is equipped with a ramp-up which will prevent excessive load on the engine during startup.

A further problem faced by drivers using auxiliary power systems, similar to those faced by drivers that do not use an auxiliary power source, is that the drivers do not realize they are drawing power over and above that capable of the unit, and thus, deplete the vehicle battery resulting in an inability to start the main engine. Thus, also recognized is the need for a compact auxiliary power unit which includes a voltage or current regulator which will interrupt or limit current output of its power generator to various high-drain electrical components during periods of very high loading to prevent vehicle battery depletion, thus preventing an "engine no-start incident" from occurring.

SUMMARY OF THE INVENTION

In view of the foregoing, embodiments of the present invention advantageously provide a vehicle, typically a semi-tractor trailer or other truck having a main engine, a main battery, a personnel compartment preferably including a compartment often referred to as "the sleeper," and at least general provisions for an external auxiliary compartment often used to store tools or accessories and which can carry an auxiliary power unit assembly to provide auxiliary power to operate an auxiliary air conditioning and heating system. For example, in an embodiment of the present invention, the unit includes an auxiliary power unit assembly positioned in the external auxiliary compartment. The auxiliary power unit assembly includes various components specifically selected such that they form a stand-alone unit that can fit within the external auxiliary compartment when the compartment is in a closed position and require minimum retrofitting to the vehicle in order to deliver heating, cooling, and additional electric power to the vehicle. The primary component is an auxiliary engine, preferably a lightweight single cylinder diesel that can draw from the vehicle fuel supply. An auxiliary alternator is positioned adjacent to and powered by the auxiliary engine to provide DC electric power to a plurality of selected electrical components including an inverter which provides AC electric power. An auxiliary condenser is also positioned adjacent to and powered by the auxiliary engine to provide cooling fluid through a condenser and an expansion valve to an evaporator which can be retrofitted inside or adjacent to the sleeper. An auxiliary voltage regulator is electrically connected to the auxiliary alternator to control voltage and amperage generated by the auxiliary alternator.

Advantageously, in the preferred embodiment of the present invention, the voltage regulator can selectively disable power to at least one of the electrical components in the event of low vehicle battery voltage, when so existing, to thereby prevent excessive battery depletion. This prevents the driver having to succumb to a "no-start" situation where the driver inadvertently depletes the vehicle batteries to a point where there is insufficient power to restart the vehicle. The vehicle engine includes a block heater electrically preferably connected to the vehicle battery, the auxiliary alternator, and the voltage regulator. In the preferred embodiment of the present invention, the voltage regulator is adapted to selectively disable power to the block heater and/or the inverter in the event of low vehicle battery voltage, when so existing, to thereby prevent excessive battery depletion. This allows the alternator to charge the battery while still providing either heating or cooling to the sleeper. The monitoring and disabling function can be accomplished according to a duty cycle to, among other things, prevent any erroneous effect due to momentary voltage fluctuations. The voltage regulator also can sense engine speed "RPM" during start-up to allow engine speed to obtain a minimum preselected speed prior to enabling the auxiliary alternator to supply power. Further, the voltage regulator can limit maximum available current from the auxiliary alternator when the auxiliary compressor is engaged to avoid overloading the auxiliary engine and can disengage the alternator from supplying power in the event the engine speed decreases below a preselected speed.

The auxiliary engine is preferably cooled by a liquid coolant fluid based radiator system similar to that provided to a main engine of the vehicle. An auxiliary radiator is synergistically included in the external auxiliary compartment to cool an engine coolant fluid. An associated auxiliary fan can selectively provide cooling air to the auxiliary radiator when a temperature of the engine coolant fluid exceeds a preselected temperature. This radiator system provides an auxiliary heat exchanger positioned within the vehicle passenger compartment heated fluid to heat air in the vehicle passenger compartment. Further, the auxiliary fan can be set to not be powered when the temperature of the engine coolant fluid is below the preselected temperature to enhance heating of the vehicle passenger compartment during cold weather operation.

Embodiments of the present invention also include a method of power regulation of an auxiliary power unit assembly to operate an auxiliary air conditioning and heating system. For example, in an embodiment of the present invention the method includes operating the auxiliary engine while the main engine is off, thereby generating DC voltage with the auxiliary alternator, applying a charging voltage from the auxiliary alternator to the main battery, converting some of the DC voltage to AC voltage and powering an AC electrical component, and ceasing to power the AC electrical component if the main battery voltage drops below a selected minimum. Its regulator senses the engine speed (RPM) of an auxiliary engine during start-up to allow engine speed to obtain a minimum selected speed prior to enabling an auxiliary alternator to drive an electrical load until after the auxiliary engine obtains the minimum selected speed, determining whether an auxiliary compressor is being driven by the auxiliary engine, and responsive to such determination, limiting maximum available current from the auxiliary alternator to power the various electrical components when the auxiliary compressor is engaged, to avoid overloading the auxiliary engine. The method can also include selectively disabling power to the block heater and optionally the inverter in the event of low vehicle battery voltage to prevent excessive vehicle battery depletion, and to provide a maximum voltage to the battery to recharge the battery when simultaneously providing heating or cooling, as desired, to a vehicle personnel compartment.

BRIEF DESCRIPTION OF THE DRAWINGS

So that the manner in which the features, advantages and objects of the invention, as well as others which will become apparent, are attained and can be understood in more detail, a more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
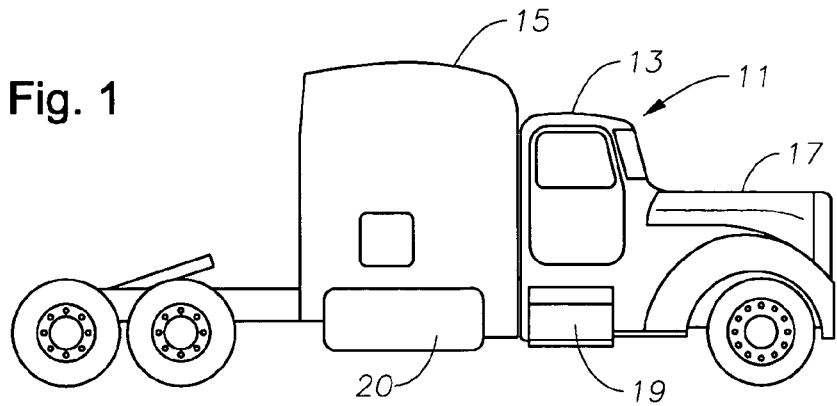
FIG. 1 is a perspective view of the passenger side of a truck cab having a side compartment containing an auxiliary power unit mounted beneath the passenger door, each being constructed according to an embodiment of the present invention.
Figure 2:
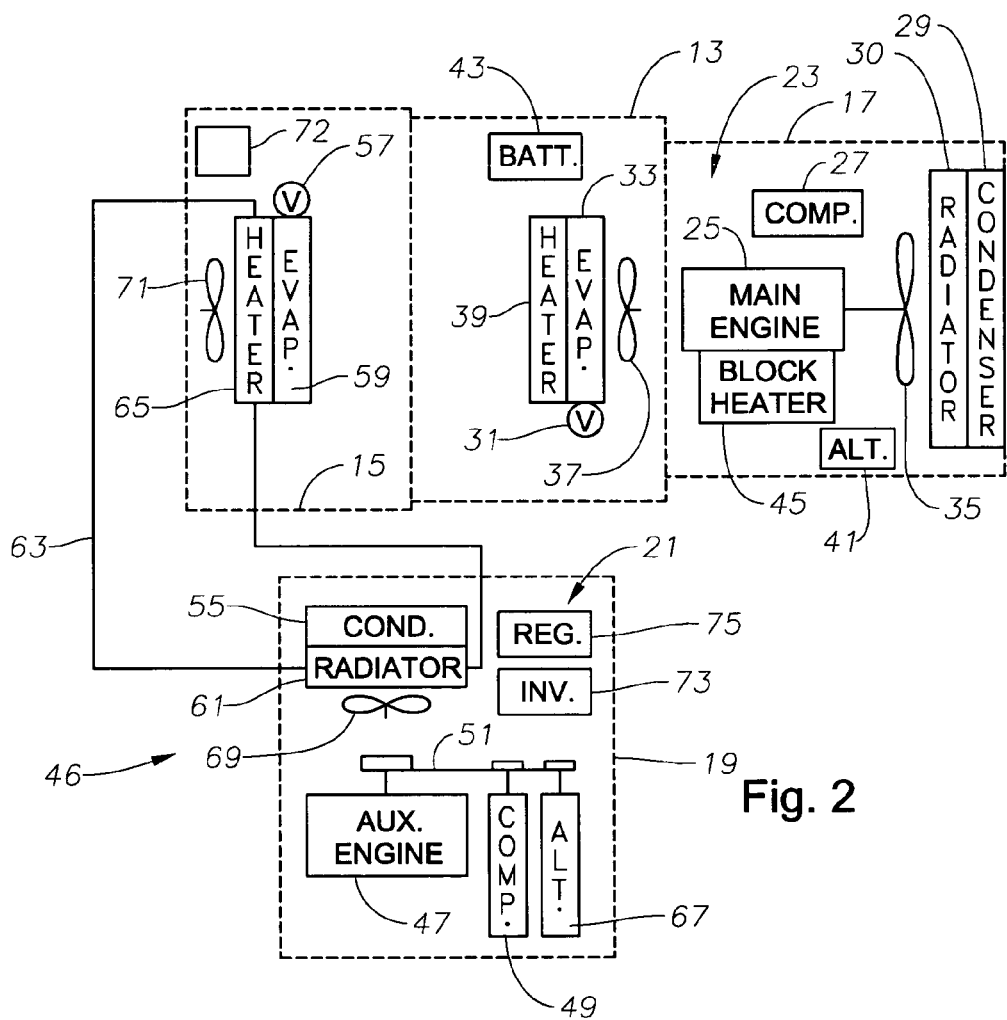
FIG. 2 is a schematic representation of an air conditioning system powered by the engine of the truck shown in FIG. 1, and a schematic representation of the auxiliary power unit including an auxiliary air conditioning system and positioned in the side compartment shown in FIG. 1 according to an embodiment of the present invention.

FIG. 1 illustrates a truck tractor 11 that has a forward passenger compartment or cab 13 and a rear sleeping and resting compartment 15. The driver is situated in cab 13 while driving truck 11, and uses the rear passenger compartment 15 for storage, a living area, entertainment center, and sleeping at other times. Truck tractor 11 has an engine compartment 17 in front of or below cab 13. Typically, a side compartment 19 is mounted to a side frame of truck 11, below cab 13. Typically, the side compartment 19 is used for storage and as a step for persons to use while entering and exiting cab 13. In the present invention, side compartment 19 preferably encloses an auxiliary power unit 21 (FIG. 2). Compartment 19 could alternately be located elsewhere, such as behind fuel tank 20, where it would not be used as a step to cab 13. Compartment 19 is preferably adapted to be mounted on rails (not shown) to allow for easy removal. Further, compartment 19 preferably has the size and dimensions of a standard Peterbilt® toolbox and includes bottom vents and side air holes (not shown) to provide cooling and ventilation for the components of the auxiliary power unit 21 positioned inside the compartment 19, described below.

Referring to FIG. 2, truck tractor 11 has a primary air conditioning system 23 with standard components, which perform their standard functions known in the art of heating, ventilation, and air conditioning. Primary air conditioning system 23 is powered by the primary diesel engine 25 of truck tractor 11. Primary engine 25 drives compressor 27 through a belt drive. A condenser 29 is mounted in front of an engine radiator 30. An expansion valve 31 and evaporator 33 are mounted in forward passenger compartment 13. A primary fan 35 is driven by primary engine 25 for discharging air through condenser 29 and radiator 30. A primary blower 37 discharges air through evaporator 33 and a conventional heater coil 39.

Primary air conditioning system 23 provides cooler air when truck 11 is being driven or stopping briefly. Generally, when primary air conditioning system 23 is used to provide cooler air to passenger compartments 13 and 15 (FIGS. 1 and 2), high-pressure gaseous refrigerant passes from compressor 27 to condenser 29 where it is liquefied. It then passes through expansion valve 31 where it expands into a gas, and into evaporator 33 where air from forward compartment 13 passes through evaporator 33 and is cooled by the cold refrigerant. The warm gaseous refrigerant then flows to compressor 27.

More specifically, compressor 27 is driven by engine 25 and compresses the refrigerant from a gaseous phase to a saturated gas. The refrigerant exits compressor 27 and flows into condenser 29. Primary engine fan 35 blows air across condenser 29. While in condenser 29, heat transfers from the refrigerant to the air passing across condenser 29, thereby making the refrigerant cooler. The cooler refrigerant condenses into liquid, and flows from condenser 29 to expansion valve 31, where the refrigerant expands and flows into evaporator 33. Blower 37, which is electrically driven, supplies air to passenger compartments 13 and 15 (FIGS. 1 and 2), blows air across evaporator 33. While the refrigerant passes through evaporator 33, heat transfers from the air flowing across evaporator 33 to the refrigerant inside of evaporator 33. By transferring heat from the air passing over evaporator 33 to the refrigerant inside of evaporator 33, the air entering passenger compartments 13 and 15 (FIGS. 1 and 2) is cooled. The heat transferred from the air passing over evaporator 33 to the refrigerant inside causes the refrigerant to evaporate. The refrigerant then passes from evaporator 33 back to compressor 27.

Heater 39 provides warmer air when truck 11 is being driven or stopping briefly. Hot water from engine 25 is transferred to heater 39. Primary blower 37 forces air from cab 13 through heater 39, which warms the air with hot water from primary engine 25. The water from engine 25 is cooled due to the loss of heat, and returns to radiator 30 for further cooling before returning to engine 25.

Primary engine 25 also drives a conventional primary alternator 41 that charges batteries 43. Primary engine 25 may also have a block heater 45, which has a conventional electrical resistance element for heating the block of engine 25 while engine 25 is not operating.

Still referring to FIG. 2, truck 11 can be equipped with an auxiliary power unit 21 located and generally enclosed in compartment 19 and including an auxiliary air conditioning system 46. The auxiliary power unit 21 has a small engine 47, which is preferably a four-stroke diesel engine that runs on fuel from the same source as the engine of truck tractor 11. Fuel line connections can be readily made with minor modifications to a fuel pickup area (not shown) of the vehicle fuel tank. The auxiliary air conditioning system 46 is powered by auxiliary engine 47. The system 46 includes an auxiliary compressor 49 that can be driven by a belt 51. The system 46 has a condenser 55 that is also mounted in compartment 19. Condenser 55 has an intake (not shown) connected by a conduit or refrigeration line to compressor 49 and an outlet (not shown) connected by a conduit or refrigeration line (not shown) to an expansion valve 57 and an evaporator 59 mounted to sleeping compartment 15. Evaporator 59 is shown mounted inside sleeping compartment 15, however, it could also be mounted to the rear or below the compartment 15. These components are used in a similar fashion as the components in primary air conditioning system 23 to cool the passenger compartments 13 and 15 (FIGS. 1 and 2).

The auxiliary air conditioning system 46 also has an auxiliary radiator 61 for cooling auxiliary engine 47. A water line 63 selectively transfers hot water from radiator 61 to an auxiliary heater exchanger or coil 65 mounted adjacent evaporator 59. Auxiliary engine 47 drives an auxiliary generator preferably in the form of a DC alternator 67, which supplies preferably DC power to drive an auxiliary fan 69 for discharging air through radiator 61 and condenser 55. Alternator 67 also supplies electrical power to a blower 71 for discharging air through heater 65 and evaporator 59 into sleeping compartment 15. Note, a DC alternator is an alternator equipped with rectifiers to produce a DC output. Although there are significant benefits in producing and then rectifying alternating current voltage to produce a direct current voltage for a vehicle, use of a DC generator is also within the scope of the present invention. Thus, the term "alternator," used throughout, refers to either a DC alternator or a DC generator.

The auxiliary air conditioning system 46 supplies cooled air to passenger compartments 13 and 15 (FIGS. 1 and 2) in substantially the same way as primary air conditioning system 23, when primary air conditioning system 23 is not operating. Auxiliary compressor 49 is driven by auxiliary engine 47 and compresses cooling fluid or refrigerant from a gaseous phase to a saturated gas. The refrigerant exits auxiliary compressor 49 and flows into condenser 55. Auxiliary fan 69, which is preferably electrically driven, blows air across condenser 55. While in condenser 55, heat transfers from the refrigerant to the air passing across condenser 55, which causes the refrigerant to condense into liquid. The refrigerant flows from the condenser 55 to expansion valve 57 along a conduit or refrigerant line, where the refrigerant expands and flows into evaporator 59. Blower 71, which is also electrically driven, blows air across evaporator 59 to cool the passenger compartments 13 and 15 (FIGS. 1 and 2). The heat transferred from the air passing over evaporator 59 to the refrigerant inside causes the refrigerant to evaporate. The refrigerant then passes from evaporator 59 back to compressor 49 via a second conduit or refrigerant line.

Similarly, during cold weather when primary engine 25 is not operating, heated water from engine 47 passes through water line 63 to heater coil 65, to heat air blown over heater coil 65 by auxiliary blower 71, to thereby heat passenger compartments 13 and 15 (FIGS. 1 and 2). In the warm air mode, heater coil 65 can function as the primary cooling radiator for auxiliary engine 47 with the auxiliary fan 69 not powered unless the water temperature for the auxiliary engine 47 exceeds a preselected value, such as, for example, 190 degrees F. or the refrigerant pressure of the cooling system exceeds a preselected value. A control panel 72 can be mounted in compartment 15 to provide for automatic or manual temperature control of the temperature within compartment 15. When selecting heat on the control panel 72, a potentiometer (not shown) sets a flowrate of the water or radiator fluid of radiator 61 to heater coil 65, thereby controlling the amount of heat delivered to the passenger compartments 13, 15. When selecting cold on the control panel 72, the selection controls a cycling of compressor 49, thereby controlling the amount of refrigerant or cooling fluid delivered to the evaporator 59.

Auxiliary power unit 21 may optionally have an inverter 73, also preferably positioned within auxiliary compartment 19, to supply 110 VAC power for operating appliances in sleeping compartment 15, such as a microwave oven, a coffee maker, and a television set. A voltage controller or regulator 75, also preferably positioned within auxiliary compartment 19, is incorporated with the circuitry of auxiliary power unit 21 for controlling voltage and amperage generated by alternator 67. Voltage regulator 75 also can selectively control the duty cycle of the block heater 45 and can selectively turn on and off block heater 45 and inverter 73 in the event of low battery voltage.

Embodiments of the present invention include a ramp-up feature whereby either the rotational speed of the auxiliary engine 47 is sensed or a specific time delay, such as, for example, 10-30 seconds, is instituted such that the engine 47 reaches a minimum speed prior to engaging the compressor 49, alternator 67, or both. For example, referring to FIG. 3, when auxiliary power unit 21 is first started, voltage regulator 75 will sense the rotational speed of auxiliary engine 47. As per steps 77, 79 and 81, voltage regulator 75 will electrically disengage the auxiliary alternator 67. That is, the voltage regulator 75 will cause an open circuit condition in the auxiliary alternator 47, which will prevent auxiliary alternator 67 from supplying any voltage until the rpm of engine 47 reaches a selected level, for example, 2500 rpm. A potentiometer (not shown), or other device having a similar function, can be used to vary the engine speed setting or time delay selection. Steps 77, 79 and 81 prevent overloading engine 47 at startup. Further, though not depicted, in the preferred embodiment of the present invention, if the speed of the auxiliary engine 47 were again to drop below the selected level, the auxiliary alternator 47 would be disengaged As indicated by step 83, voltage regulator 75 will also sense whether auxiliary compressor 49 is on. If so, as indicated by step 85, to avoid overloading auxiliary engine 47, voltage regulator 75 will limit the output of alternator 67 to a less than maximum amount, preferably 65 amps. Compressor 49 cycles on and off due to its own control circuitry that is based on the operator controls 72 and/or the temperature monitored in sleeping compartment 15. Normally, when the temperature is cool enough based on the operator selection, a clutch releases compressor 49 from rotating even though auxiliary engine 47 keeps running. The release and actuation of the clutch is monitored in step 83 as well as physically turning off the auxiliary air conditioning system, such as during cold weather. If compressor 49 is off for either reason, voltage regulator 75 will allow the amperage output of alternator 67 to be much higher, such as 110 amps, as indicated by step 87.

Referring to step 89, the output of alternator 67, whether the lower limit or the higher, may be used to power auxiliary fan 69, inverter 73, auxiliary blower 71, block heater 45, and truck lights and accessories, such as the radio. Alternator 67 also charges the main truck batteries 43. Normally, auxiliary power unit 21 does not have a special purpose battery, but rather, relies on the main truck batteries 43. Voltage regulator 75 also monitors the voltage of batteries 43 to make sure that enough voltage is always present to start primary engine 25.

Figure 3:
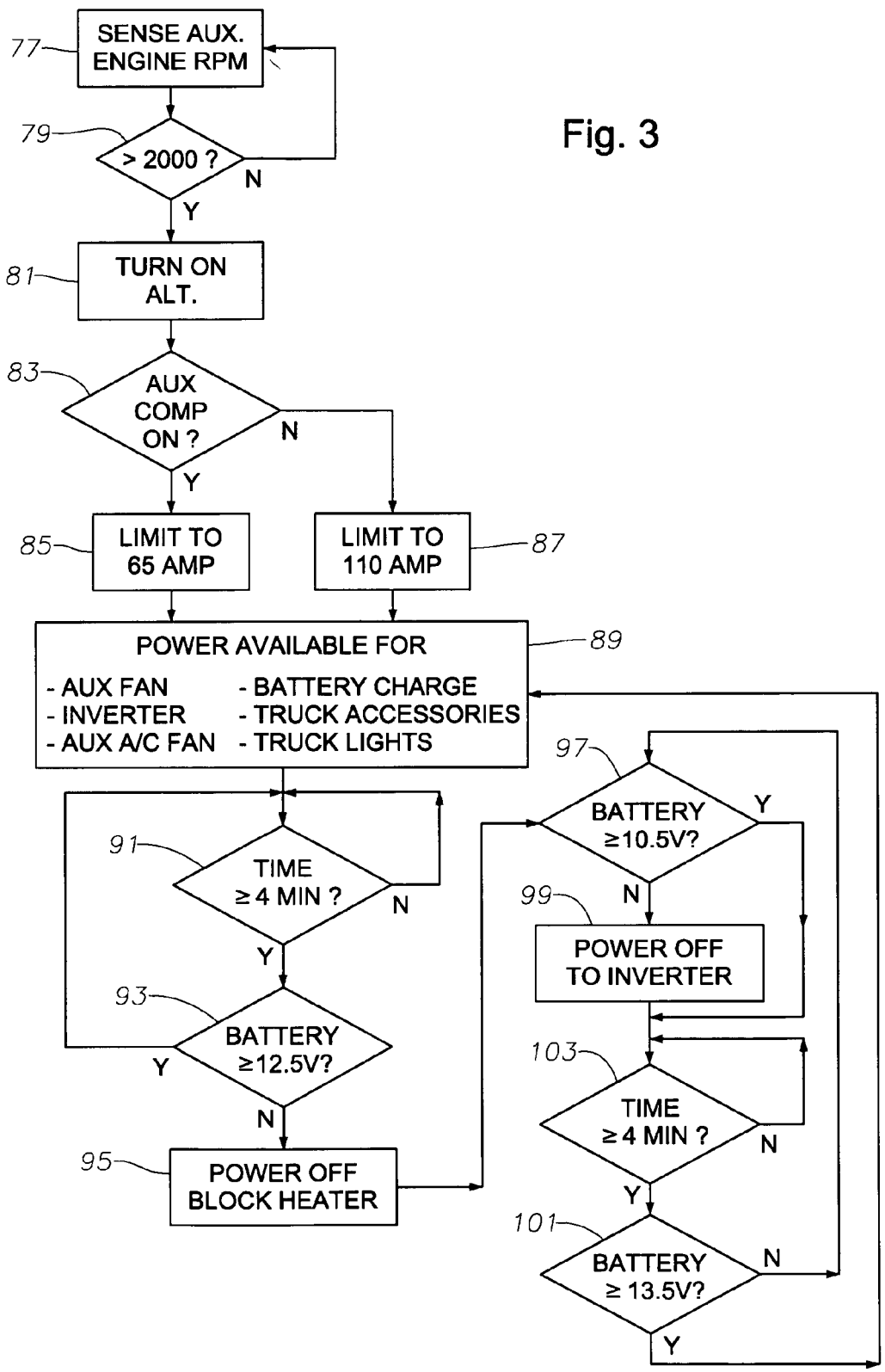
FIG. 3 is a flow chart illustrating power regulation for the auxiliary power unit system of FIG. 2 according to an embodiment of the present invention.

Still referring to FIG. 3, during cold weather operations, the operator may selectively turn on or off block heater 45 (FIG. 2). Step 89 indicates voltage regulator 75 providing power to the block heater 45. Because of the power requirements of the block heater 45, the voltage regulator 75 can be set to either continuously or cyclically check the voltage of the batteries 43 for a selected time, such as, for example, four minutes, as indicated by step 91. As indicated in step 93, if the voltage regulator 75 determines that the voltage of the batteries 43 has dropped below a selected value, such as, for example, 12.5 volts, power to the block heater 45 is then turned off according to step 95. Power remains off to the block heater 45 until the voltage of batteries 43 exceed a second selected voltage, such as, for example, 13.5 volts, at which time power is available for the above listed electrical components including the block heater 45 as indicated in step 101. On the other hand, as indicated in step 97, if the load on alternator 67 is heavy enough so that the voltage level is below a third selected value, such as, for example, 10.5 volts, or if even after the block heater 45 was turned off, the voltage continues to drop, then power to the inverter 73 is also turned off, as indicated in step 99 and the inverter 73 will remain off until the desired voltage is reached, as indicated in step 101. With the block heater 45 and/or the inverters 73 off, the voltage regulator 75 will continue to monitor voltage, preferably according to a duty cycle, such as, for example four minutes, as indicated in step 103.

Referring to FIGS. 1 and 2, in operation, the operator of truck tractor 11 would normally use primary air conditioning system 23 while driving from one place to another. The operator turns on auxiliary power unit 21 when the operator reaches a destination where the operator intends to stay at for a while, and the operator needs to turn off primary engine 25 of truck tractor 11. Auxiliary power unit 21 supplies cooled air to forward and rear passenger compartments 13 and 15 after primary engine 25 of truck tractor 11 is turned off and no longer supplying power to primary air conditioning system 23.

The operator of truck 11 would normally use primary heater 39 to heat passenger compartments 13 and 15 while driving from one place to another. The operator turns on auxiliary air conditioning system 48 to heat passenger compartments 13 and 15 when the operator reaches a destination where the operator intends to stay for a while, and the operator needs to turn off the truck. Auxiliary air conditioning system 46 will supply heated air through auxiliary heater 65 or cold air through evaporator 59 to forward and rear passenger compartments 13, 15, generally after primary engine 25 of truck 11 is turned off.

The invention has several unique advantages. For example, embodiments of the present invention provide a compact auxiliary power unit including both cooling and heating components, entirely isolated from the vehicles engine, which are generally self-contained and can be housed in a slightly modified existing auxiliary compartment. Advantageously, such unit can provide electric power to power various electronic components, heating units, air-conditioning systems, in the vehicle personnel compartments, and/or vehicle engine heating units, and can include sensors and circuitry to monitor and control the electrical components and power requirements. Also for example, embodiments of the present invention provide a compact auxiliary power unit which includes an RPM sensor or provides a time delay which will prevent excessive load on the engine during startup by limiting application of a load to the engine from the alternator. Advantageously, embodiments of the present invention include a compact auxiliary power unit which has a voltage or current regulator which will limit current output of its alternator during periods of very high loading. Further, embodiments of the present invention provide an auxiliary power unit, which includes a voltage or current regulator that prevents depletion of the vehicle main battery by selectively disabling powering various electrical components, thus preventing a no-start condition from occurring.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the auxiliary power unit assembly was described as having a DC alternator. Use of a DC generator is within the scope of the present invention. Further, the voltage regulator was described as monitoring engine a particular engine speed providing any ramp-up feature. This ramp-up feature is not limited to the speeds provided in the illustration. Further, specific amperages were described with respect to a load reduction feature. These particular amperages were for a particular embodiment. Varying the size of the engine or capacity of the alternator or operator selection would result in different optimal amperages. Still further, specific voltages and time delays were described with respect to a battery saving feature. These voltages and the time delay are merely described with respect to the preferred embodiment and can be set differently.

The invention claimed is:

1. A truck, comprising:
   a personnel compartment;
   a main engine and a main battery;
   an external auxiliary compartment connected to an exterior portion of the truck; and
   an auxiliary power unit assembly positioned in the external auxiliary compartment of the truck, the auxiliary power unit including:
     an auxiliary engine,
     an auxiliary alternator positioned adjacent to and powered by the auxiliary engine, to provide DC electric power, the auxiliary alternator being electrically connected with the main battery to charge the main battery while the main engine is off,
     an inverter electrically connected to the auxiliary alternator to convert the DC electric power from the auxiliary alternator to AC electric power for powering at least one AC electrical component, and
     an auxiliary voltage regulator electrically connected to the auxiliary alternator to control voltage and amperage generated by the auxiliary alternator, the auxiliary voltage regulator-configured to sense voltage of the main battery to selectively disable the inverter if the voltage of the main battery drops below a selected level, and to sense RPM of the auxiliary engine during start-up to allow auxiliary engine speed to obtain a minimum selected speed prior to enabling application of an electrical load to the auxiliary alternator.

2. The truck as defined in claim 1, further comprising a DC block heater electrically connected to the main battery, the voltage regulator selectively disabling the block heater in the event the voltage of the main battery drops below a selected level.

3. The truck as defined in claim 1, further comprising:
   an air conditioner compressor driven by the auxiliary engine; and
   an air conditioner condenser mounted to the auxiliary compartment for providing cooling air for the personnel compartment.

4. The truck as defined in claim 1, further comprising an auxiliary air conditioner compressor driven by the auxiliary engine, and wherein the voltage regulator limits maximum available current from the auxiliary alternator when the auxiliary compressor is engaged to avoid overloading the auxiliary engine.

5. The truck as defined in claim 2, wherein after disabling the block heater when the voltage of the battery decreased below a first preselected voltage, the voltage regulator enables power back to the block heater when the voltage of the battery exceeds a second preselected voltage, the second preselected voltage being higher than the first preselected voltage.

6. The truck as defined in claim 5, wherein after disabling the inverter, the voltage regulator enables power back to the inverter when the voltage of the battery exceeds the second preselected voltage.

7. The truck as defined in claim 1,
   wherein the auxiliary power unit assembly further comprises:
     an auxiliary condenser mounted to the auxiliary compartment,
     an auxiliary compressor positioned adjacent to and powered by the auxiliary engine, to provide coolant to the auxiliary condenser, and
     an auxiliary fan in the auxiliary compartment to provide cooling air to the auxiliary condenser when the auxiliary compressor is driven by the auxiliary engine; and wherein the truck further comprises:
     an auxiliary evaporator to provide cool air to the vehicle personnel compartment, and
     an auxiliary refrigerant line connecting the auxiliary condenser with the auxiliary evaporator to provide refrigerant from the auxiliary condenser to the auxiliary evaporator.

8. The truck as defined in claim 1,
   wherein the auxiliary power unit assembly further comprises:
     an auxiliary radiator mounted to the auxiliary compartment for cooling coolant fluid of the auxiliary engine, and
     a DC electrical auxiliary fan in the auxiliary compartment to selectively provide cooling air to the auxiliary radiator when a temperature of the engine coolant fluid exceeds a preselected temperature; and
   wherein the truck further comprises:
     an auxiliary heat exchanger to heat air for the personnel compartment, and
     a heating line to connect the auxiliary heat exchanger with the auxiliary radiator to provide heated fluid from the auxiliary engine to the auxiliary heat exchanger.

9. The truck defined in claim 8, wherein the auxiliary fan is not powered to cool the auxiliary engine when the temperature of the engine coolant fluid is below a preselected temperature.

10. A truck comprising:
   a personnel compartment;
   a main engine and a main battery;
   a DC block heater electrically connected to the main battery;
   an external auxiliary compartment connected to an exterior portion of the truck; and
   an auxiliary power unit assembly positioned in the external auxiliary compartment of the truck, the auxiliary power unit including:
     an auxiliary engine,
     an air conditioner compressor driven by the auxiliary engine, an air conditioner condenser mounted to the auxiliary compartment for providing cooling air for the personnel compartment, an auxiliary alternator positioned adjacent to and powered by the auxiliary engine, to provide DC electric power, the auxiliary alternator being electrically connected with the main battery to charge the main battery while the main engine is off, an inverter electrically connected to the auxiliary alternator to convert the DC electric power from the auxiliary alternator to AC electric power for powering at least one AC electrical component, and an auxiliary voltage regulator electrically connected to the auxiliary alternator to control voltage and amperage generated by the auxiliary alternator, the auxiliary voltage regulator configured to sense voltage of the main battery to selectively disable the block heater in the event the voltage of the main battery drops below a first selected level and to selectively disable the inverter if the voltage of the main battery drops below a second selected level, and to sense RPM of the auxiliary engine during start-up to allow auxiliary engine speed to obtain a minimum preselected speed prior to enabling application of an electrical load to the auxiliary alternator.

11. The truck as defined in claim 10, wherein the voltage regulator limits maximum available current from the auxiliary alternator when the auxiliary compressor is engaged to avoid overloading the auxiliary engine.

12. A method of power regulation of an auxiliary power unit assembly for a truck having a main engine and main battery, the auxiliary power unit being mounted to the truck and having an auxiliary engine and an auxiliary alternator driven by the auxiliary engine, the method comprising the steps of:

(a) operating the auxiliary engine while the main engine is off, thereby generating DC voltage with the auxiliary alternator, sensing engine speed of the auxiliary engine during start-up to allow the engine speed to obtain a minimum selected speed prior to enabling the auxiliary alternator;

(b) applying a charging voltage from the auxiliary alternator to the main battery;

(c) converting some of the DC voltage to AC voltage and powering an AC electrical component; and (d) ceasing to power the AC electrical component if the main battery voltage drops below a selected minimum.

13. The method as defined in claim 12, further comprising the step of:

powering an air conditioner compressor with the auxiliary engine; and wherein step (a) further comprises limiting maximum available current from the auxiliary alternator when the auxiliary compressor is being driven to avoid overloading the auxiliary engine.

14. The method as defined in claim 12, further comprising the steps of:

providing DC power from the main battery to a block heater;

disabling power to the block heater if the main battery voltage drops below the selected minimum; and enabling power to the block heater, after being disabled, when the battery voltage exceeds a second selected voltage, the second selected voltage being higher than the selected minimum.

\* \* \* \* \*